March 9, 1943.  C. TIETIG  2,313,457
PROCESS AND APPARATUS FOR METALLURGICAL REDUCTION
Filed Nov. 10, 1941
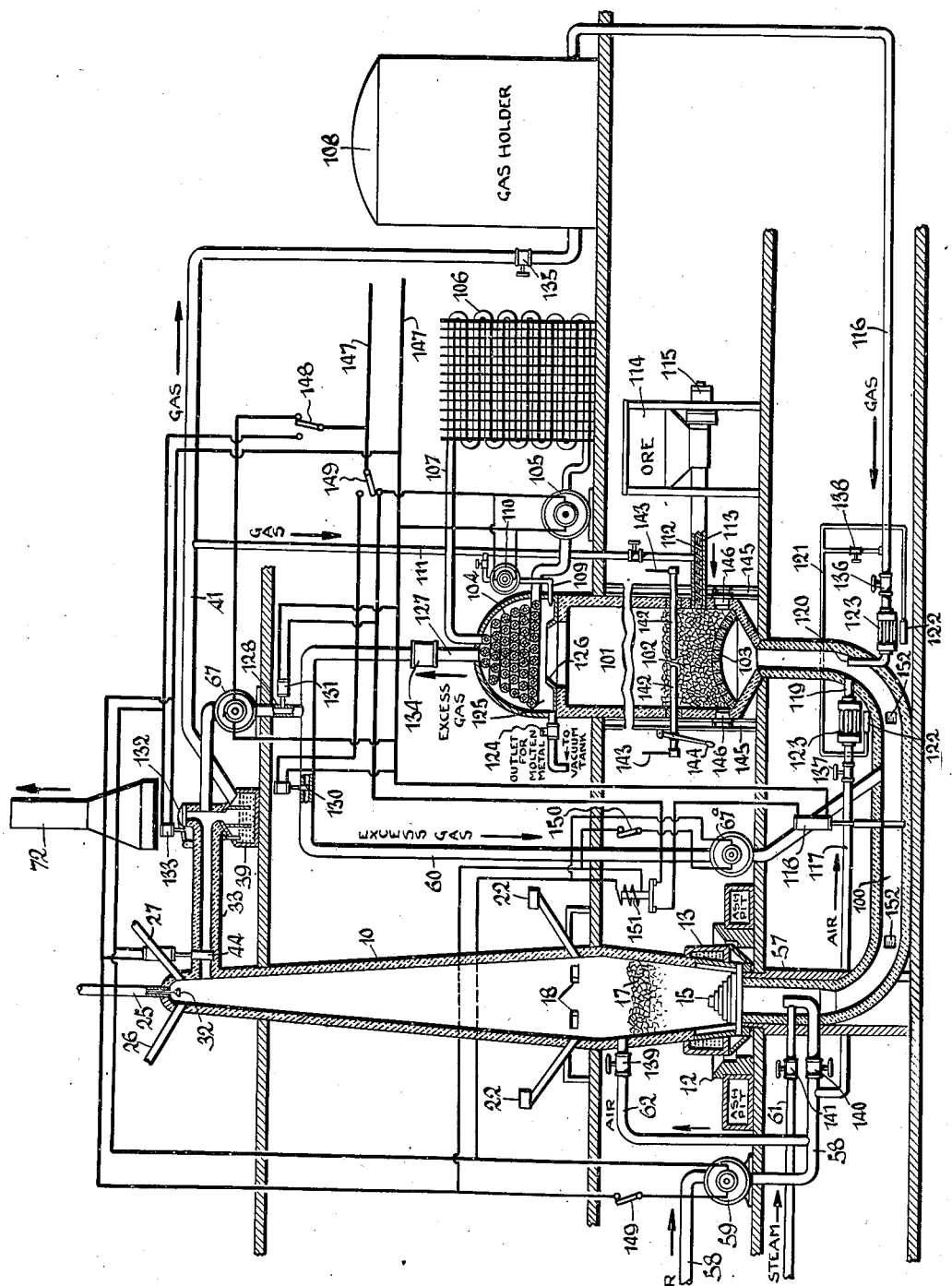
INVENTOR.
Chester Tietig Patented Mar. 9, 1943

2,313,457

UNITED STATES PATENT OFFICE 2,313,457

PROCESS AND APPARATUS FOR METALLURGICAL REDUCTION

Chester Tietig, Covington, Ky.

Application November 10, 1941, Serial No. 418,545

9 Claims. (Cl. 266—13)

This invention relates to a process of and apparatus for metallurgical reduction. The purpose of the invention is to provide a method and means for reducing and recovering metals of the kind which occur in reducible form, and which have boiling points not higher than that of iron. In particular I regard my method and process most suitable for the treatment of the ores tin, lead, zinc, cadmium, mercury, copper, magnesium and aluminum. By a modification of the process I can make sponge iron.

Briefly stated, my process comprises generating a stream of pure or impure hydrogen, or other reducing gas, delivering such gas from the generator directly to a reducing furnace and on the way to said furnace and while the said gas is still hot, burning a portion of the gas with air or oxygen whereby to increase the temperature of said gas to the reducing point of the ore, or as near thereto as is advisable to go and then passing such partially burned gas through a bed of the ore which is to be reduced. If partial combustion of the reducing gas is not desired, or if such partial combustion does not make the gas hot enough for efficient reduction, or for any other reason, I may provide electrodes, preferably graphite, within the fuel bed to furnish additional heat or electrolytic action, to complete the reduction of the metal, or to contribute toward its volatilization. I reduce the metal at such a high temperature that the metal boils and passes upward through the metallurgical furnace to a condenser, wherein it is deposited from the gas stream. An electric precipitator of the Cottrell type is the full equivalent of the condenser.

The kind of generator that I prefer to use is described in United States Patent #2,126,150 to A. R. Stryker, but I am not limited to this generator. Any kind of generator furnishing a hot supply of reducing gas can be used; however I prefer those generators which deliver their gaseous product downward. For the manufacture of magnesium and aluminum, I prefer to use pure hydrogen.

In the accompanying drawing, the figure is a longitudinal section of a furnace and generator connected together to form my apparatus. The generator is a modification of the type described in the Stryker Patent #2,126,150.

The parts of the Stryker apparatus are numbered as they are in Patent #2,126,150. Those elements of the figure which are not Mr Stryker's are numbered 100 and over.

In the figure, 10 is a vertical retort which is provided with fuel inlet ports 18 and charging hoppers 22 for maintenance fuel, the bed of which is indicated by 17. 15 is a rotary, continuously operating grate which is adapted to throw ashes over a circular wall 12 into a circular ash pit. A water jacket 13 surrounds the lower part of the retort. The latter is provided with a top fuel inlet 25 or 26 in case the fuel is liquid, or 27 if it is gaseous. A bell 32 is provided to close the opening 25 when desired. Air and steam are provided at the bottom of the retort through pipes 58 and 61 respectively, such air and steam being used for the revivification of the fuel bed when necessary. Periodic revivification is essential since the Stryker process is not continuous. Secondary air above the fuel bed is provided by pipe 62. Blower 59 is provided to furnish air for blasting under pressure. Near the top of the retort, an off-take 33 in which there is a hot valve 44 is provided to lead off the products of combustion made during the blasting period. The off-take terminates in a wash box 39. A gas delivery pipe 60 is preferably provided but is not absolutely necessary. It may be omitted if desired.

In the Stryker disclosure, there is a conical inverted bell 57 below the grate 15. According to the present invention, said bell 57 is now extended into a large refractory line pipe or main 100 which is of a general U-shape. It connects the bottom of the generator to the bottom of a metallurgical furnace 101. The pipe 100 is intended to deliver gas which has been produced in the generator 10 and which has preferably been drawn through the entire fuel bed therein, to the metallurgical furnace. While I prefer in my process to use hydrogen as pure as can be furnished by the Stryker process and apparatus, I am not limited thereto, but may use gas from the generator which is not so completely cracked. In other words, the gas may contain for certain purposes, substantial amounts of methane and other higher hydrocarbons.

My combination of apparatus is so assembled that the gas from the generator which flows through pipe 100 and the furnace 101, is drawn through the furnace and from the generator by an exhauster 67. It is necessary to dispose of the gas which has been used in the reduction of the ore 102, which is shown in the furnace as a bed which rests upon a perforated refractory arch 103. The gas which is not used up in the reduction is drawn by exhauster 67, and can be recycled into the retort 10 if desired, through the wash box 39 and off-take 33, valve 44 being opened for this purpose. The excess gas may also be recycled by the exhauster 67 via pipe 60, into the wash box 39, and out by means of pipe 41 to a gas holder 108. The supply of gas in such a holder may be used to keep the reduction process going in the furnace 101, during the time when the generator 10 is being blasted. The reduction process is therefore continuous, or at least not interfered with to the extent of letting the fuel bed cool off, even though the generator cannot furnish gas all of the time. I may however, provide a pair of generators 10, so that one furnishes gas while the other is being blasted. Such an arrangement, it is not deemed necessary to illustrate, since the expedient of furnishing hot air to a blast furnace by a multiplicity of stoves is common in the iron industry.

The advantages that accrue from using a generator directly connected to a metallurgical furnace, comprise the utilization of the gaseous product of the generator before it has a chance to cool substantially. Since hydrogen delivered by the generator of Stryker is at a temperature of 550° Fahrenheit, it will be seen that the direct utilization of such hot gas presents quite a saving in fuel, and is especially important in processes where very high temperatures must be reached. My furnace is preferably of the vertical type, although a horizontal type can be substituted. It operates on the principle of the simultaneous reduction and volatilization of the metal from the ore. This principle is of value in the treatment of pure oxide or hydroxide ores such as those of tin and magnesium. Reduction and volatilization of the metal in is such cases tantamount to its complete removal from the fuel bed, which it leaves as metal vapor and water vapor, these pass together through the furnace, the upper end of which is provided with cooling coils 104. These coils convey a coolant which is circulated by a pump 105, which is forced through a cooling system 106, by means of piping 107. It is inadvisable to circulate water in the coils 104, since leakage would cause explosion. I prefer to use diphenyl or high-boiling mineral oil as the coolant, since leakage of these inside the furnace causes no particular hazard. The cooling coils 104 should be located as close to the fuel bed as may be provided, that they still can remain cool enough to condense upon their outer surfaces an efficient proportion of the metal vapor ascending from the fuel bed. Too great an elevation of the coils will allow the metal to condense upon the upper walls of the furnace, while too close a proximity of the coils to the fuel bed will make them too hot to condense the metal vapor properly.

In order to assist and regulate condensation on the cooling coils 104, I prefer to use for auxiliary cooling, a jet of expanding reducing gas injected tangentially under coils 104, by a nozzle or nozzles 109. This expanding gas is first compressed by means of a compressor 110, supplied with gas from a pipe 111, which connects pipe 41 with a gas-lock 112, at the lower end of furnace 101. The gas-lock referred to is merely a straight pipe extending into the furnace, and containing a screw feed 113. It is supplied with the ore to be fed into the furnace from hopper 114, below which is suspended motor 115. Its purpose is to prevent air entering the furnace.

Both gas and air are supplied to main 100 by auxiliary pipe lines. Gas is supplied by line 116 from gas holder 108. Air is supplied by line 117 from line 58. In order to prevent an explosive mixture being formed in the generator 10, a hot valve 118 is provided about midway in main 100. The auxiliary jets 119 and 120 which feed air and gas respectively into the main, are located on the furnace end of main 100, that is beyond the hot valve 118. A small take-off pipe 121 which bleeds hydrogen from line 116, is provided with burners 122 below bundles 123 of heat-exchange tubes in both lines 117 and 116. These burners are for the purpose of insuring that the gas and air fed into main 100, are of a sufficiently high temperature to ignite when mixed, regardless of whether there is sufficient gas concentration in main 100 as a whole. Therefore enough hydrogen will be supplied at all times to burn with whatever air is introduced, so that air cannot get into the furnace to cause an explosion or explode with any degree of violence in main 100. The necessity for electrical spark plugs or other ignition devices is obviated, since air from pipe 117 will burn spontaneously in the main.

The molten metal is recovered through valved outlet 124, which discharges into a vacuum tank (not shown). The metal accumulates in the top of the furnace in the gutter 125, which is formed around the inner edge of the condensing part of the furnace by a circular cowl 126. The condenser is run preferably at such a temperature that it will be cool enough to just condense metal out of the gas stream, but will be warm enough to allow this metal to drop off in drops or globules into the gutter 125. This temperature will vary with the kind of metal being treated, but the proper point can be found by any skilled furnace operator.

The excess gas or water vapor from the furnace 101, passes up through the condensing tubes 104, into a pipe or stack 127, which connects with pipe 60 and with a second pipe 128, in which there is a blower 67, arranged to deliver gas into the top of the wash box 39. A pipe 41 connects the wash box 39 with the gas holder 108. Electrically controlled valves 130 and 131, are arranged in pipe 60 and pipe 127 respectively, so that excess gas from the furnace can be immediately recycled back to main 100, or it can be delivered through pipe 128, wash box 39, and pipe 41 into gas holder 108, and from there by means of pipe 116 back to main 100. Valve 130 also prevents steam or air from main 100 reaching the furnace through pipe 60. A second blower 67a is provided in pipe 60, for the purpose of returning excess gas to the main 100, if the gas holder is filled to capacity. The blower runs opposite to the corresponding exhauster 67 in the Stryker patent. The gas can also be voided to the atmosphere through stack 72, by opening the lid 132 of the wash box 39, by means of electrically controlled valve 133, if the system becomes too full of gas.

Since water vapor will be formed in considerable amounts by burning the hydrogen with air in the main 100, and also by reduction of the ore in the furnace, this vapor must be gotten rid of to a certain extent in the system. Part of it accumulates at the bottom of wash box 39 as condensate, some of it condenses in the gas holder, and can be voided from the bottom thereof, and whatever uncondensed water vapor remains is recycled through the fuel bed 17 of the generator, and there decomposed into water gas.

Since condenser 104, even when aided by the cold gas blast from nozzle 109, will hardly be 100% efficient, a Cottrell precipitator may have its electrodes installed in the stack 127. These electrodes are indicated symbolically by the box 134. The precipitator may be omitted, or may replace the condenser 104. The nozzle 109 may also be omitted, together with its compressor 110. If it is desired to use the water vapor in the excess gas from the furnace for gas making purposes before it condenses, it is possible to do so by opening the hot valve 44, and closing the fuel bell 25 and inlet pipes 26 and 27. The excess gas will then travel down the generator to be cracked to water gas in the fuel bed 17.

It is evident then that provision has been made for the uninterrupted operation of the furnace 101, when the gas generator 10 is being blasted. Gas is available from two sources, even when the generator 10 is not furnishing any due to its having its fuel bed revivified. At such a time gas is being delivered to the main 100 from the gas holder, under the urging of the pressure developed by blower 67, or the weight of the bell of the gas holder. Gas is also being delivered into main 100, by the recycling action through pipe 60 under the urging of blower 67a. During this time hot valve 118 is closed, so that combustible gas does not mix with air delivered into main 100 through pipe 58, because pipe 60 discharges on the furnace side of the hot valve 118. When generator 10 is operative, a third source of supply of gas is an optional feed through the generator through off-take 33, valve 135 being closed. That is, enough excess reducing gas may be obtained from the furnace to be recirculated therethrough for further reduction of the ore by way of the pipe 127, exhauster 67, washbox 39, pipe 41, pipe 111 and gas lock 112 in the order named. The generator then does not have to be forced so hard.

While it is to be understood that regulatory or shut-off valves may be provided wherever necessary or desirable, note should be taken of the following valves of this nature: 135 is a valve in pipe 41 which regulates the stream of gas entering the gas holder. Its function is to prevent gas from entering the gas holder, when it is desired that the gas should enter the generator 10 instead. 136 and 137 are valves in the gas and air lines respectively which enter the main 100. 138 is a valve regulating the amount of gas for the burners 122. 139 is a valve regulating the amount of blasting air admitted above the fuel bed in generator 10. 140 is a valve to control blasting air. 141 controls the steam which may be admitted under fuel bed 17.

The furnace 101 may be subject to numerous modifications within the scope of the prior art. As stated before, electrodes 142 may be provided to project into the ore bed, to provide additional electrothermal heat, and to so assist in the reduction of the ore. A separate electric circuit 143 with the appropriate regulatory devices, is provided for this purpose. Means 144 is also provided for the purpose of continuously spacing the electrodes. The furnace may be oil jacketed if desired by a jacket 145, which also serves to strengthen the furnace walls at the refractory zone. Slag notches 146 may be provided at intervals around the furnace. The construction involving the perforated arch 103 and the slag notches, may be modified in favor of any other method of voiding slag or apparatus therefor which is known to the present art.

In order to assure safety of operation even when inexperienced persons operate a plant of this nature, electrical interlocking circuits are provided to govern certain of the valves and the blowers 67, 67a and 59, so that the formation of explosive mixtures of gas and air will be precluded. In these interlocking circuits 147 are the power supply mains. 148 is a two-way switch connecting one lead 147 with a circuit governing blower 59, hot valve 44, stack valve 133, blower 67 and hot valve 118. 149 is a two-way switch governing another circuit controlling pump 105, compressor 110, and valves 130 and 131.

When the switches 148 and 149 are closed as shown, blower 67 is energized, also valves 118 and 131. If 131 is open, it closes, and vice versa and if 130 is closed as shown, it opens. If 148 is turned to the alternative position, blower 59 is energized, hot valve 44 and stack valve 133 are likewise operated. It is therefore insured that the blast air injected into generator 10, will have an outlet through off-take 33, and up-stack 72. Likewise the diametrically opposite positions of the settings of valves 130 and 131, insure that the gases from the furnace will always have an outlet, whether it be through pipe 128 or pipe 60. Blower 67a is included in the circuit with blower 67, so that it is energized whenever the other is deenergized. Hand operated switches such as 149 and 150, may of course be included in the circuit, for shutting down either of these blowers for repairs. Pump 105 and blower 110 are energized whenever excess gas is being recirculated through pipe 60, so that in no case will the metal-bearing vapor pass the condenser 104, without an efficient degree of condensation being performed. Hot valve 118 is arranged to be closed, whenever the generator 10 is being blasted, so that air injected into the main 100 will not mix with the gases within the furnace 101, until it has been burned with hydrogen.

When switch 148 is in position to energize valves 133, 44 and blower 59, a relay 151 is also energized, thereby opening the circuit to hot valve 118, which may be closed in case switch 149 is closed as shown.

It is evident that the circuits illustrated involve the incompatibility of certain units. These are—

(a) Blowers 67 and 67a cannot operate at the same time.

(b) Blowers 67 and 59 cannot operate at the same time.

(c) Blowers 59 or 67a cannot operate, unless valve 118 is closed.

(d) Valve 118 opens if pump 105 is energized, and blower 59 is not running.

(e) The circuit of blower 59 cannot be energized, without energizing the circuit for blower 67a.

These interlocks are sufficient to guard against any but a deliberate attempt to create an explosive mixture of gases.

The operation of the plant will be evident to experts from the foregoing description. It is recommended that the furnace 101 be operated under just sufficient pressure of gas from the main 100, in order to keep the perforations in the perforated arch 103 free enough from slag to insure their operation. It is not essential that all slag should be kept out of the perforations. It is sufficient that the perforations remain sufficiently open to provide the furnace with enough gas. If enough gas is not being furnished, either the size of the perforations should be increased or the pressure of gas from main 100 should be increased, or the temperature of the furnace should be increased in order to make the slag less viscous. The size of the slag notches 146 should be kept as small as is consistent with the proper riddance by the furnace of its slag. The object in keeping the slag exit ports small, is to insure that they will at all times be filled with slag, so as to prevent access of air to the furnace. If for any reason a serious quantity of slag flows down into the main 100, it may be cleaned out through ports 152 when the main is cold. Any conventional devices for voiding molten slag from the main 100 may be employed. If desirable, slag notches 146 may be surounded by an oil jacket of substantial size, and the molten slag may discharge under the surface of oil. Proper cooling arrangements such as fins, must then be provided on the jacket.

In the foregoing description, the electrically controlled valves are represented as of the solenoid type, in which closing is effected by gravity. Other types of valves such as motor operated may be substituted, and appropriate changes made in the electric circuit according to knowledge already in possession of skilled electrical engineers.

Among the ores which can be treated by the method and apparatus disclosed, are oxide and carbonate ores. Before processing they should be concentrated so far as commercially feasible, and should be finely divided, but not so finely that great impediment is offered to the passage of gas through them. The preferred size of particle, is between a $\frac{1}{2}$ inch sphere or cube and a $\frac{1}{4}$ inch sphere or cube. It is pointed out that one advantage of the present plant disclosed, is that hydrogen can conveniently be generated and used from cheap fuels, with the substantial absence of any deleterious proportion of carbon monoxide. For the hydrogen generator shown, I may substitute the one shown in Patent #2,200,607 of May 14, 1940, to A. R. Stryker.

In the modification of the process in which sponge iron is made, I feed high grade magnetite or hematite ore or hammer scale into the furnace, by the screw and bin apparatus 112, 113, 114 and 115, and take it out from a point diametrically opposite by an identical apparatus operating in a reverse direction. That is, the screw 113 pulls the material out of the furnace. For such operation a temperature is employed which is sufficient to reduce the ore, but insufficient to melt the resulting iron.

The proportion of the hydrogen generated which is to be burned with air in main 100, may be from five percent to twenty-five percent by volume, depending upon the temperature necessary to reduce the ore and the amount of water vapor that it is permissible to have in the reducing gas.

I claim as my invention:

1. In an ore reducing apparatus, a hydrogen generator, a metallurgical furnace arranged to receive the gas from said generator, a pipe line adapted to return excess gas from said furnace to said generator for revivification, a gas holder, a pipe line connecting said gas holder and said furnace, a second pipe line adapted to return gas from said gas holder for re-use in said furnace, and valve means for selectively directing the excess gas from said furnace either to said generator or to said gas holder.

2. In a metallurgical reduction apparatus, a generator for intermittently producing a stream of reducing gas, a metallurgical furnace arranged to receive the gas from said generator, a refractory lined pipe, means for burning a portion of said gas in said pipe, means for recycling excess gas from said furnace back into said pipe, means for injecting an air blast for said generator into said pipe and valve means for preventing substantial mixing of combustible gas and injected air to any dangerous extent within said pipe.

3. In a metallurgical reduction apparatus, a generator for a stream of reducing gas, a metallurgical furnace adapted to receive the gas from said generator, a main connecting said generator and said furnace, a gas holder and selective piping adapted either to direct the excess gas from the furnace into said gas holder and thence back to the main or to return the excess gas to the generator for revivification or to return the excess gas directly to the main.

4. In a metallurgical reduction apparatus, a generator for a stream of reducing gas, a metallurgical furnace adapted to receive the gas from the generator, a main connecting said generator and said furnace, a gas holder, selective piping adapted either to direct excess gas from the furnace into said gas holder and thence back to the main, or to return the excess gas to the generator for the elimination of water vapor, or to return said excess gas directly to the main, piping for blasting said generator with air, a plurality of electrically controlled valves in said air and gas piping, blowers arranged to handle streams of air and gas in appropriate systems of piping for said gases, and a plurality of interlocking electrical circuits including said valves and blowers, said circuits and valves being arranged to make impossible in ordinary operation the formation of dangerous mixtures of the reducing gas and air within said apparatus.

5. In combination in a metallurgical reduction plant, a down-draft generator for hydrogen and other reducing gases, an up-draft vertical reduction furnace including means for condensing metals from vapors and gases leaving the furnace from the top thereof, piping connecting the top exit of said furnace with the top interior of said generator, a main for the delivery of gases from the bottom of said generator to the bottom of said furnace, a hot-valve in said main, a branch pipe from said first mentioned pipe to the main connecting therein beyond the hot valve in the direction of the furnace, blowers in said pipe and branch pipe for moving the gases therethru, a gasholder, piping for supplying said gasholder with excess gas from said furnace, piping for conducting gas from the gasholder to the main, means for supplying a controlled amount of air to said main whereby, in co-operation with the piping, the furnace may be supplied with hot reducing gas through the main optionally from the generator, the branch pipe or from the gasholder so that continuous operation of the furnace is feasible.

6. A vertical metallurgical furnace comprising a refractory-lined shell, a perforated brick arch forming a floor in the lower part of said shell, an inlet in the lower part of the furnace for reducing gas, the shell having a plurality of small slag ports circumferentially arranged just above the junction of the arch and the shell, a condenser in the upper part of said shell, a circumferential gutter around the interior of the lower part of said shell just below the condenser, said gutter being arranged to receive a drip of molten metal from the condenser and to deliver a stream of molten metal from the furnace, means for circulating a high-boiling liquid thru said condenser, means for tangentially injecting an expanding stream of reducing gas under the condenser, an exit pipe for excess gas, said pipe leaving the furnace substantially from the top of the shell and means for feeding ore to the furnace.

7. In a metallurgical reduction plant, a vertical shaft furnace adapted to contain a charge of ore to be reduced, a main connected to said furnace for introducing a reducing gas adjacent the bottom of the furnace, a condensing chamber in communication with the top of the furnace, cooling means in said condensing chamber adapted to condense the metal vapors passing from the furnace into said chamber, and means for burning a controlled portion of the reducing gas in said main for raising the temperature of the reducing gas entering the furnace.

8. In a metallurgical reduction plant, a vertical shaft furnace adapted to contain a charge of ore to be reduced, a main connected to said furnace for introducing a reducing gas adjacent the bottom of the furnace, a condensing chamber in communication with the top of the furnace, cooling means in said condensing chamber adapted to condense the metal vapors passing from the furnace into said chamber, and an air inlet opening into said main adjacent the connection of said main with the furnace to allow burning a controlled portion of the reducing gas in said main far raising the temperature of the reducing gas entering the furnace.

9. In a metallurgical reduction plant, a vertical shaft furnace adapted to contain a charge of ore to be reduced, a main connected to said furnace for introducing a reducing gas adjacent the bottom of the furnace, a condensing chamber in communication with the top of the furnace, cooling means in said condensing chamber adapted to condense the metal vapors passing from the furnace into said chamber, an air inlet opening into said main adjacent the connection of said main with the furnace to allow burning a controlled portion of the reducing gas in said main for raising the temperature of the reducing gas entering the furnace and a gas inlet opening into said main in the vicinity of the air inlet for providing a flame in the main in the absence of the reducing gas.

CHESTER TIETIG.